Sept. 25, 1945.   J. L. UNDERHILL   2,385,479
FILM REEL SPINDLE
Filed Oct. 26, 1942
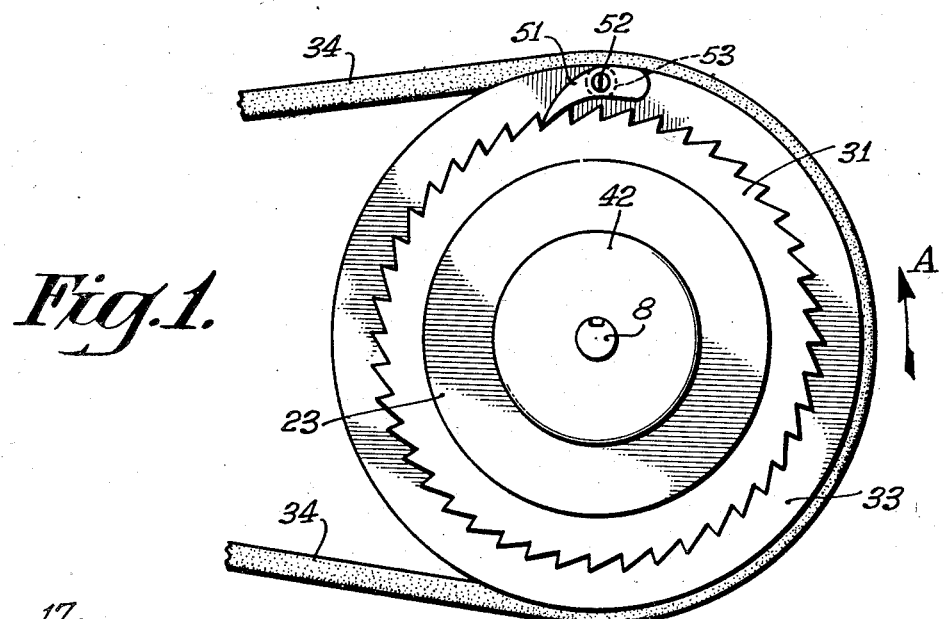
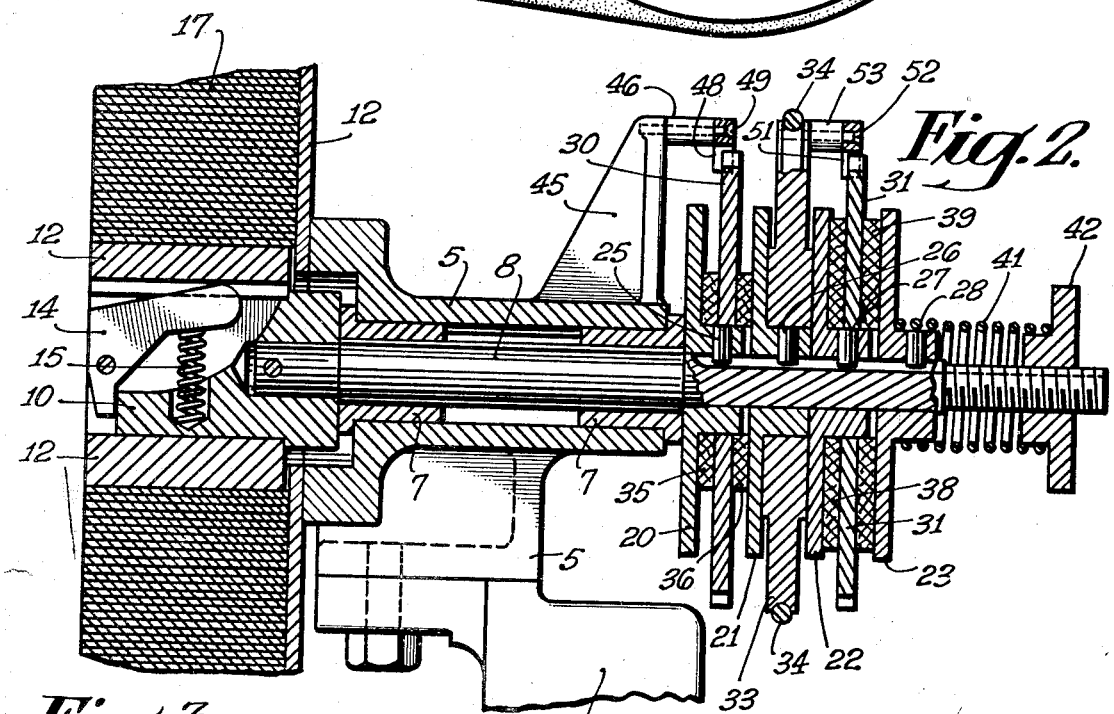
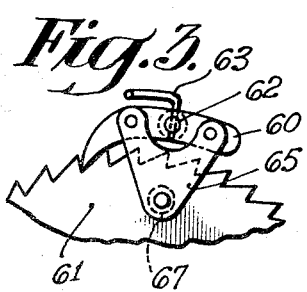
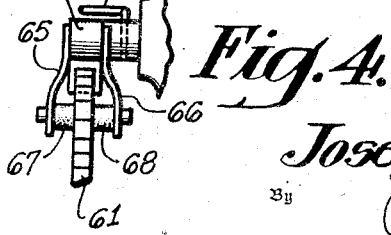
Inventor
Joseph L. Underhill
By Orl R. Goshaw
Attorney Patented Sept. 25, 1945

2,385,479

UNITED STATES PATENT OFFICE 2,385,479

FILM REEL SPINDLE

Joseph L. Underhill, Indianapolis, Ind., assignor to Radio Corporation of America, a corporation of Delaware Application October 26, 1942, Serial No. 463,361

9 Claims. (Cl. 242—55)

This invention relates to the art of printing motion picture sound film and is particularly related to a reversible spindle system wherein positive and negative films are driven in either direction, although the invention is applicable to any mechanism utilizing reversible film reel spindles.

In the art of film printing, certain types of printers are adapted to operate to advance the film in both directions. In using the printers in this manner, the take-up and supply reel spindle mechanism for each film should operate in either direction without attention. Although this general principle is known, as evidenced by Ross Patent No. 2,217,183 of October 8, 1940, the present invention is an improvement over prior devices as will be pointed out hereinafter.

In operating reversible spindles, when the reel is functioning as a take-up reel, a certain amount of energy is required to properly wind the film on the reel and this energy must be transmitted through some form of slipping clutch mechanism to compensate for the changes in reel diameter as the film is wound on the reel. When the reel is supplying film, a certain amount of drag is desired to provide a uniform tension in the film to prevent it from unwinding from the reel in jerks. This braking or drag energy must also be imparted through a variable clutch to compensate for the change in the film reel diameter. It has been found that the amount of energy required for winding and braking is different in order to obtain satisfactory operation of the reel in both directions. The present invention is directed to a spindle mechanism which will permit a film reel to alternatively function as a take-up or supply reel without adjustment of any kind.

The principal object of the invention, therefore, is to facilitate the take-up and supply of film from a film reel.

Another object of the invention is to provide an improved film reel spindle for both taking up and supplying film without adjustment.

A further object of the invention is to provide a take-up and supply reel spindle combination which will automatically impart greater winding energy to the reel when the reel is functioning as a take-up reel than the energy required to rotate the reel when functioning as a supply reel.

A further object of the invention is to provide a combination take-up and supply reel spindle which operates silently.

A further object of the invention is to provide a silent pawl and sprocket for a combination supply and take-up film reel spindle.

Although the novel features which are believed to be characteristic of this invention are pointed out with particularity in the claims appended herewith, the manner of its organization and the mode of its operation will be better understood by referring to the following description, read in conjunction with the accompanying drawing, in which:

Fig. 1 is a plan view of one modification of a ratchet wheel and pawl arrangement used in the invention, Fig. 2 is a cross-sectional view through the take-up and supply reel spindle combination, and Figs. 3 and 4 are detailed views of another modification of the pawl and ratchet wheel arrangement of Fig. 1.

Referring now to the drawing in which the same numerals refer to identical elements, 5 is a bearing support adapted to be mounted on a frame 6 of a printing machine. Mounted within the bearing support 5 are bearings 7 in which a spindle shaft 8 is adapted to rotate. On the left end of the shaft 8 is a reel hub 10 upon which a film reel 12 is mounted, the film reel 12 being held for rotation on the hub 10 by latch 14 under tension of a spring 15. A film 17 is shown in cross-section on the reel 12.

At the right end of the spindle shaft 8 is mounted a series of disc friction flanges 20, 21, 22 and 23, all of the same diameter and keyed to the shaft 8 by means of pins 25, 26, 27, 28, respectively. The discs are free to move longitudinally of the shaft. Mounted for free rotation on the collar of flange 20 is a ratchet wheel 30, while mounted for free rotation on the collar of flange 22 is a ratchet wheel 31. Similarly mounted on the collar of flange 21 is a pulley 33 which is adapted to be driven by a belt 34.

Positioned between flange 20 and ratchet wheel 30 is a friction ring 35 which may be made of any suitable friction material such as oiled felt, or leather. I found that oiled felt produced the best results and prefer this material. A similar friction ring 36 is placed between the ratchet wheel 30 and the flange 21. To the right of the pulley 33 and between flange 22 and ratchet wheel 31 is a friction ring 38 of the same material as rings 35 and 36, but of a larger diameter than rings 35 and 36. A ring 39 of the same size as ring 38 is mounted between ratchet wheel 31 and flange 23. To maintain and adjust the pressure between the flanges, friction rings and ratchet wheels, a coil spring 41 under compression is mounted between the disc flange 23 and an adjusting nut 42 threaded on the end of shaft 8.

This adjusting nut 42 permits any desired axial pressure to be exerted on the series of flanges and friction rings to provide the proper driving energy and supply drag at any particular time and also to take up for wear on the friction rings.

Stationarily mounted on the upper portion of bracket 45 of the bearing support 5 is an arm 46 upon which is pivoted a pawl 48 on a screw 49. A similar arrangement is provided on the circumference of the pulley 33, the pawl 51 being pivoted on screw 52 on the arm 53. In this arrangement the pawl 48 is maintained stationary while the pawl 51 is adapted to be rotated with the pulley 33. Thus, when the belt 34 rotates the pulley 33 in a counter-clockwise direction as indicated by the arrow A, the pawl 51 will engage the sprocket wheel 31 and the wheel will be rotated with the pulley. The friction between the friction rings 38 and 39 and the flanges 22 and 23 will rotate the flanges 22 and 23 and the spindle shaft 8, thus taking up the film 17 on the reel 12. A certain amount of turning torque will be imparted to the shaft and thus to the reel 12 in accordance with the size of the rings 38, 39 and the tension of the spring 41.

When the mechanism is reversed, the pulley 33 is driven in a clockwise direction, while the film being drawn from the reel also rotates the shaft 8 in a clockwise direction. Since the pulley 33 is rotated at a faster rate than the ratchet wheel 31, which is rotated by the film pull, the pawl 51 on the pulley will slide over the notches of the ratchet wheel, and the wheel 31, disc flanges 22 and 23 and friction rings 38 and 39 will rotate as a unit. However, when the direction of ratchet wheel 30 is reversed, the stationary pawl 48 engages the teeth of the ratchet wheel 30 and rotation of the wheel 30 is prevented. The flanges 20 and 21, however, are rotated with the shaft 8 and friction will thus be obtained between the friction rings 35 and 36 and the flanges 20, 21 and the wheel 30, to provide a drag on the film reel as the film is unwound. This frictional drag, however, will be less than the winding friction for the film, since the friction rings 35 and 36 have a smaller mean diameter than the take-up rings 38 and 39. This is an advantage of the present invention over prior spindles for the same purpose wherein the drag friction is equal to the take-up friction as shown in the above-mentioned patent. A heavy drag on the film from a supply reel is both deleterious to the film and to the operation of the printer.

The present invention thus provides, in a simple construction with a single tension adjustment, a greater amount of turning torque when the reel is utilized as a take-up reel, then when the reel is used as a supply reel, the latter amount of friction being only that necessary to maintain tension in the film and prevent it from unrolling. These different amounts of friction are obtained by making the friction rings 38 and 39 of a larger mean diameter or radius than the rings 35 and 36, as shown in Fig. 2. This action is based on the formula for power transmitted by a disc clutch, namely: $H = \mu r FNS/63,000$, where H is horsepower transmitted; $\mu$, the co-efficient of friction; $r$, the mean radius of the engaging surfaces; F, the axial force in pounds; N, the number of frictional surfaces; and S, the number of revolutions per minute. Since $\mu$, F, N, and S are constant, the transmitted power varies directly with $r$ or the mean radius of the discs or rings 35, 36, 38, and 39. The use of separate spring tensions for the two clutches could be used if desired, but the simpler single tension arrangement has been found satisfactory.

Another feature of the invention is illustrated in Figs. 3 and 4. It is well known that in a pawl and ratchet wheel arrangement, the pawl is generally biased by spring tension or gravity to engage the teeth of the ratchet wheel and when the wheel is driven in the opposite direction the pawl will click over the wheel teeth. By the construction shown in Figs. 3 and 4, the device is made silent.

In Figs. 3 and 4, the pawl 60 is adapted to engage the teeth of the sprocket wheel 61, the pawl being pivoted at point 62. A stopper arm 63 is arranged over the engaging end of the pawl to limit its movement so that it just clears the teeth of the wheel 61. On either side of the pawl, V-type members 65 and 66 have their arms riveted or similarly attached to the pawl 60, while their vertices have mounted thereon rubber or leather friction elements 67 and 68 which bear on opposite sides of the ratchet wheel 61. Now, when the wheel 61 is driven in a clockwise direction, the friction between the members 67 and 68 and the sides of the wheel 61 will rotate the pawl into engagement with the teeth of the wheel. When the wheel is driven in the opposite direction with respect to the pawl 60, the friction will raise the engaging end of the pawl to clear the teeth of the wheel, the pawl being stopped by the stop arm 63. In this manner a silent pawl and ratchet combination is provided.

I claim as my invention:

1. A film reel drive mechanism comprising a rotatable shaft, a film wheel on said shaft adapted to be rotated therewith, a wheel adapted to rotate said shaft in one direction, said shaft being rotated in the opposite direction by the film from said reel, and a pair of overrunning clutches on said shaft, said clutches including friction rings, the friction rings of one of said clutches imparting a certain amount of frictional winding energy to said shaft when said shaft is rotated in one direction by said wheel and the friction rings of the other of said clutches imparting a different amount of frictional drag to said shaft when said shaft is rotated by the film pull.

2. A film reel drive mechanism in accordance with claim 1 in which means are provided to maintain the same amount of axial pressure on said friction rings of both of said clutches.

3. A film reel drive mechanism in accordance with claim 1 in which said friction rings in one of said clutches have a larger mean diameter than the friction rings in the other of said clutches.

4. A film reel drive mechanism comprising a rotatable shaft, a film reel on one end of said shaft, and a pair of frictional overrunning clutches on the other end of said shaft, each of said clutches including at least one collared disc flange keyed to said shaft, ratchet wheels adapted to rotate on the collars of the respective flanges, and at least one free frictional ring between respective wheels and flanges, one of said rings having a larger mean radius than the other of said rings.

5. A film reel drive mechanism in accordance with claim 4 in which means are provided on said shaft to maintain the same axial pressure between all of said wheels, rings and flanges.

6. A film reel drive mechanism comprising a shaft adapted to be rotated in both directions, a film reel on said shaft, a plurality of disc flanges keyed to rotate and be rotated by said shaft and movable axially along said shaft, a pair of ratchet wheels mounted on said shaft, friction rings coaxially interposed between said wheels and flanges on said shaft, means for rotating one of said ratchet wheels and thereby rotating certain of said flanges through the friction between said certain flanges, certain of said friction rings and said one ratchet wheel, the friction between said other ratchet wheel, said other friction rings and flanges imparting a drag on said shaft when said shaft is rotated by film being pulled from said reel, and means for holding said last-mentioned ratchet wheel stationary when said shaft is rotated by said film pull.

7. A film reel drive mechanism in accordance with claim 6 in which said first-mentioned friction rings are larger than said last-mentioned friction rings.

8. A film reel drive mechanism in accordance with claim 6 in which means are provided to maintain all of said flanges, rings and wheels under a constant axial pressure, said means being manually adjustable to vary the pressure between said rings, flanges and wheels.

9. A film reel drive mechanism comprising a shaft, an overrunning clutch adapted to rotate said shaft in one direction, said clutch including a friction disc and ring having a certain amount of contacting surface area, a second overrunning clutch adapted to impart a drag on the opposite rotation of said shaft, said second clutch including a friction disc and ring having another amount of contacting surface area, the mean radius of the contacting area of said second mentioned friction disc and ring being different from the mean radius of the contacting area of said first mentioned friction disc and ring, each of said clutches also including a pawl and ratchet wheel mounted on said shaft, said wheels contacting respective friction rings of said clutches, means for rotating one of said pawls to rotate its respective wheel when said pawl engages said wheel, means for holding said other pawl stationary to stop its respective wheel from rotating when said pawl engages said wheel, and means interposed between respective pawls and wheels to prevent said pawls from contacting said wheels during the opposite relative rotation of respective pawls and wheels.

JOSEPH L. UNDERHILL.